United States Patent [19]
Deogan et al.

[11] Patent Number: 5,900,281
[45] Date of Patent: May 4, 1999

[54] PLATINUM-CONTAINING THERMAL PROTECTIVE COMPOSITIONS

[75] Inventors: Malkit S. Deogan, Chesterfield; Rubin Feldman, Ladue; Allen W. Thorpe, Olivette; Edward W. Taylor, Jr., Ballwin, all of Mo.

[73] Assignee: Nu-Chem, Inc., Fenton, Mo.

[21] Appl. No.: 08/889,346

[22] Filed: Jul. 8, 1997

Related U.S. Application Data

[60] Provisional application No. 60/020,589, Jul. 8, 1996.

[51] Int. Cl.$^6$ ............................... B05D 5/00; B05D 7/24; B05D 3/02; C09K 21/00
[52] U.S. Cl. .................................... 427/393.3; 106/18.12; 106/18.13; 106/18.26; 252/601; 252/606
[58] Field of Search .................................... 427/373, 224, 427/228, 393.3; 252/601, 606; 264/29.1; 106/18.11, 18.12, 18.13, 18.26, 18.21

[56] References Cited

U.S. PATENT DOCUMENTS

| | | | |
|---|---|---|---|
| 2,680,077 | 6/1954 | Nielsen et al. | |
| 3,022,190 | 2/1962 | Feldman . | |
| 3,159,601 | 12/1964 | Ashby . | |
| 3,220,972 | 11/1965 | Lamoreaux . | |
| 3,284,216 | 11/1966 | Kaplan . | |
| 3,714,047 | 1/1973 | Marion et al. | 428/421 |
| 3,775,452 | 11/1973 | Karstedt . | |
| 3,849,178 | 11/1974 | Feldman | 117/72 |
| 3,913,290 | 10/1975 | Billing et al. | 52/347 |
| 3,915,777 | 10/1975 | Kaplan | 156/202 |
| 4,018,962 | 4/1977 | Pedlow | 428/245 |
| 4,064,359 | 12/1977 | Peterson et al. | 174/107 |
| 4,069,075 | 1/1978 | Billing et al. | 427/373 |
| 4,189,545 | 2/1980 | Modic | 521/131 |
| 4,276,332 | 6/1981 | Castle | 428/36 |
| 4,292,358 | 9/1981 | Fryer et al. | 427/173 |
| 4,521,549 | 6/1985 | Penneck | 427/117 |
| 4,529,467 | 7/1985 | Ward et al. | 156/307.3 |
| 5,180,801 | 1/1993 | Wengrovius et al. | 528/15 |
| 5,372,846 | 12/1994 | Feldman et al. | 427/224 |
| 5,487,946 | 1/1996 | McGinniss et al. | 428/413 |
| 5,591,791 | 1/1997 | Deogon | 524/80 |
| 5,733,946 | 3/1998 | Loiselle et al. | 427/373 |

*Primary Examiner*—Diana Dudash
*Attorney, Agent, or Firm*—Polster, Lieder, Woodruff & Lucchesi

[57] ABSTRACT

An intumescent composition for protecting a substrate against fire and thermal extremes includes a polymer binder containing a small amount of platinum, preferably in the form of a coordination complex. The binder is a non-silicone based polymer, and the platinum acts as a catalyst under fire conditions to protect the char and increase char life, thereby increasing the time of protection. The binder is preferably an epoxy, most preferably an epoxy polysulfide. The platinum is preferably mixed with nickel, most preferably as a nickel-platinum ammonia complex, the complex being present in an amount of less than two percent by weight of the composition. The complexes are preferably tetrafluoroborate salts. The composition also preferably includes a solvent, a carbonific, a spumific, and a polymerization catalyst.

20 Claims, No Drawings

5,900,281

PLATINUM-CONTAINING THERMAL PROTECTIVE COMPOSITIONS

This Application is a provision of Ser. No. 60/020,587 filed on Jul. 8, 1996.

BACKGROUND OF THE INVENTION

This invention relates to thermal protective compositions which form chars when exposed to fire or other thermal extremes. The invention is particularly well suited to use in epoxy-based intumescent coatings for substrates, but its usefulness is not limited thereto.

The situations in which it is desirable to protect materials from heat and flame include, for example, protecting static structures such as petroleum storage tanks, chemical production equipment, electrical cable trays, and structural steel from fire; protecting transportation equipment such as tank cars, aircraft cabins and seat cushions from the same risks; protecting the exterior surfaces of spacecraft and high performance aircraft from heat generated by atmospheric friction; and protecting the nozzles of rocket engines from the heat of propellant gases.

Various compositions are known which provide protection against fire and other thermal extremes, such as temperatures above about 300° C. Some of the compositions are foamed inorganic passive insulative compositions which protect merely by their low thermal conductivity and their thickness as applied. These include, for example, foamed cement or intumesced silicates. The present invention is not concerned with such systems, but with systems which include a polymeric binder and which form a char when exposed to fire or hyperthermal conditions. The char-forming compositions may operate by various modalities. The compositions may be used in various forms, including thick film (mastic) coatings, thin film coatings, castings, extrusions, and others. The compositions may include organic or inorganic binders and various additives. Upon exposure to heat the compositions slowly lose weight as portions of the composition are volatilized, and a char is formed which provides a measure of protection against the transfer of heat energy. Eventually, the char is consumed by physical erosion and by chemical processes, primarily oxidation by oxygen in the air and by free radicals produced by the coating or otherwise in a fire environment, and protection is lost. The length of time required for a given temperature rise across a predetermined thickness of the composition, under specified heat flux, environmental, and temperature conditions, is a measure of the effectiveness of the composition in providing thermal protection.

When subjected to fire or other hyperthermal conditions, different coatings behave differently.

Ablative coatings swell to less than twice their original thickness. They provide limited passive thermal protection, but they tend to produce dense chars having good physical and chemical resistance.

Intumescent coatings swell to produce a char more than five times the original thickness of the coating. This char provides an insulative blanket which provides superior thermal efficiency, but at the cost of some of the physical and chemical properties of the ablative coatings. The char of the intumescent materials tends to form coarse and irregular cell structures, cracks, and fissures as it expands, and the char may not expand uniformly at corners, leaving areas where the char provides far less protection than the average thermal protection of the underlying structure. Examples of the intumescent systems include silicate solutions or ammonium phosphate paints or mastic compositions such as those disclosed in Nielsen et al., U.S. Pat. No. 2,680,077, Kaplan, U.S. Pat. No. 3,284,216, or Ward et al., U.S. Pat. No. 4,529,467.

A third type of char-forming coating is disclosed in Feldman, U.S. Pat. No. 3,849,178. When subjected to thermal extremes, these compositions both undergo an endothermic phase change and expand two to five times their original thickness to form a continuous porosity matrix. These coatings tend to be tougher than intumescent coatings. They provide far longer thermal protection than ablative coatings, frequently longer than intumescent coatings, in part because the gasses formed by the endothermic phase change provide active cooling as they work their way through the open-cell matrix. These coatings may also have a tendency to crack and form voids and fissures.

The present invention relates primarily to the second and third types of systems. In its broader aspects, however, it is also applicable to ablative char-forming coatings. It is not, however, intended for use in elastomeric coatings, such as silicone rubber coatings.

Various methods and structures have also been used or proposed for applying these thermal protective coating materials. The most frequent approach is to apply the materials directly to the substrate, without additional structure. For many applications, however, a reinforcing material, such as fiberglass sheet or a wire mesh, has been embedded in the coating material to strengthen the material and prevent it from cracking or falling off the substrate under conditions of flame or thermal extreme. Examples of this approach are found in Feldman, U.S. Pat. No. 3,022,190, Billing et al, U.S. Pat. No. 3,913,290, Kaplan, U.S. Pat. No. 3,915,777, and Billing et al, U.S. Pat. No. 4,069,075. Sometimes the materials are first applied to a reinforcing structure such as a flexible tape or flexible wire mesh, and the combined structure is applied to the substrate. Examples of this approach are found in Feldman, U.S. Pat. No. 3,022,190, Pedlow, U.S. Pat. No. 4,018,962, Peterson et al, U.S. Pat. No. 4,064,359, Castle, U.S. Pat. No. 4,276,332, and Fryer et al, U.S. Pat. No. 4,292,358. In these last-mentioned systems, the purpose of the reinforcing structure may be both to strengthen the resulting composite and to permit its application to a substrate without directly spraying, troweling or painting the uncured coating materials onto the substrate. In any of the foregoing methods and structures, multiple layers are frequently applied to the substrate to provide additional protection.

Presently known materials and methods, however, are not as efficient, in terms of length of protection for a given weight of protective material, as desirable. Efficiency is particularly important because in many applications weight or volume is critically limited. Moreover, heavily loading coating materials with fire retardants may seriously impair their physical characteristics and otherwise limit their suitability as coatings, for example by limiting their film-forming characteristics or their water-resisting characteristics. Presently known materials are thus frequently limited to certain types of applications.

SUMMARY OF THE INVENTION

One of the objects of this invention is to provide systems and compositions for providing more efficient protection against hyperthermal conditions than presently known compositions and systems.

Another object is to provide such systems and compositions which are adaptable to a wide variety of applications.

Another object is to provide such systems and compositions which provide particularly good protection when incorporated in coatings applied to substrates with or without reinforcement or additives.

Another object of this invention is to provide such systems and compositions which provide char layers having far greater stability than previously known systems and compositions.

Other objects of this invention will be apparent to those skilled in the art in light of the following description and accompanying drawings.

In accordance with this invention, generally stated, compositions and systems for protection against hyperthermal heating are provided which include a film-forming resinous binder, a catalyst for curing the resinous binder, a blowing agent, a material which undergoes an endothermic phase change, and a small amount of platinum dispersed through at least an upper layer of the composition in a coated system, preferably uniformly throughout the coating. The platinum is preferably present in a quantity of less than 0.1% by weight of the composition, most preferably in an amount less than 0.01% by weight. The binder is an organic (non-silicone) based polymer.

Although the theory of operation does not form a part of the invention, it is believed that under fire conditions the platinum acts as a surface catalyst that adsorbs free radicals and prevents degradation of the polymeric char layer. The platinum may initially catalyze the breakdown of the resin crosslinks to permit early intumescence. It appears to decrease the initial rate of heating of the underlying substrate, then strengthens and protects the char by vitrification and increases char life, thereby increasing the time of protection for the underlying substrate.

The binder is preferably an epoxy. An epoxy polysulfide is prefered for its properties as a coating, both in ordinary use and under fire conditions. The polysulfide, however, can react with and poison the platinum unless the platinum is protected by known means or by its inclusion in a complex as set out herein.

The platinum is preferably mixed with nickel, most preferably as a nickel-platinum ammonia complex which comprises less than two percent by weight of the composition. The atomic ratio of platinum to nickel in the compositions may vary from 1:1 to 1:1000, preferably from 1:20 to 1:100. It has been found that a ratio of about 1:40 provides excellent results. Preferably, the complexes are homogeneously mixed throughout the protective composition.

The complexes are preferably tetrafluoroborate salts.

It will be seen that the compositions of the present invention include those of commonly-assigned U.S. Pat. No. 5,372,846 to Feldman and Ghatan. The complexes utilized in that patent, however, are primarily intended as intumescing and heat absorbing agents. The amounts of the complexes of the present invention, by contrast, are chosen to lengthen the life of the chars after the chars are formed. The amount of nickel complex, however, may be chosen to act as a heat absorber as well as a catalyst. The compositions of the present invention may also include the complexes of that patent, as well as many other known compositions.

Other aspects of the invention will be better understood in the light of the following description of the preferred embodiments of materials in accordance with the present invention and examples of making and using them.

DESCRIPTION OF THE PREFERRED EMBODIMENTS

The following examples are intended to illustrate the compositions of the present invention and their use as intumescent and other char-forming coatings.

EXAMPLE 1

Preparation of Complexes

A complex in accordance with the present invention is formed by dissolving 0.6 g of platinum metal in aqua regia to form an orange solution. After diluting the solution, 15 g of nickel chloride hydrate is added to form a greenish solution. To this mixed solution is slowly added an excess of ammonium hydroxide. A strong exothermic reaction occurs, and the solution turns light blue. To this solution is added 15 g of ammonium tetrafluoroborate. A dark blue paste-like precipitate is formed which under magnification is seen to be made of fine particles. This slurry is filtered, dried, and ground to a fine powder. The powdered complex is used in the compositions of the present invention.

The filtrate is dried and is found to contain five to ten percent solids based on the weight of the original solid reactants.

EXAMPLE 2

Formulation of Intumescent Coating

For purposes of making comparative tests on a protective coating of the type disclosed in Feldman, U.S. Pat. No. 3,849,178, a standard coating was formulated as follows, the amounts being parts by weight:

| Epoxy (EEW = 182–192) | 30–35 |
|---|---|
| Solvent | 3–7 |
| Pentaerythritol | 15–25 |
| Melamine | 25–30 |
| Polysulfide resin | 35–40 |
| Catalyst (amine) | 3–7 |
| Solvent | 28–35 |
| Ammonium Polyphosphate | 60–70 |
| Fibers and other fillers | 25–35 |

In order to assure uniform particle size and uniform distribution of the catralytic complexes, the dried complex is added to a liquid carrier resin and dispersed to a finely ground concentrate. The carrier can be any medium, such as epoxy, vinyl, or diglycidal ether, or the like. Preferably, the dried powder is added under high speed agitation to the carrier to assure that the particle size of the powder is reduced and the powder finely dispersed. A pebble, ball or sand mill is preferably utilized, and the resulting paste-like concentrate is filtered. Preferably, the ratio of powder to carrier is on the order of 1:1, although the ratio may be varied in accordance with well-known practice.

The composition was tested, both alone and with amounts of the dispersed powdered complex uniformly mixed in the compositions in amounts ranging from 0.25% by weight to 3% by weight, by applying the compositions to steel columns and heating to simulate a fire condition. Tests show that initial heating rates of the underlying columns were reduced by the addition of the complex in all amounts, and that maximum increases in protection time were obtained with about 0.5% (0.2% to 1.2%). of the powdered mixed complex.

Numerous variations within the scope of the appended claims will be apparent to those skilled in the art in light of the foregoing description, which is set forth only for illustrative purposes and is not meant to be limiting. Merely by way of example, the complexes may be included in a large number of thermoplastic or thermosetting resin systems such as acrylics, styrenes, polypropylenes, polyethylenes, ABS, polyamides, polyurethanes, vinylidenes, other modified epoxies and copolymers of such organic resins. These variations are merely illustrative.

We claim:

1. A char-forming thermal protective composition comprising a non-silicone resinous organic binder, a spumific, and platinum, the platinum comprising less than 0.1% by weight of the composition.

2. The composition of claim 1 wherein the platinum is in a coordination complex.

3. The composition of claim 1 further including nickel in the composition.

4. The composition of claim 3 wherein the nickel is in a coordination complex.

5. The composition of claim 4 wherein the binder is a thermoplastic resin.

6. The composition of claim 5 wherein the binder is an epoxy.

7. The composition of claim 1 wherein the platinum comprises less than 0.01% of the composition by weight.

8. The composition of claim 2 wherein the platinum complex is an ammine.

9. The composition of claim 4 wherein both the platinum and the nickel complexes are ammines.

10. The composition of claim 4 wherein the ratio of platinum to nickel is from about 1:20 to about 1:100.

11. A thermal protective composition comprising a binder which softens when exposed to hyperthermal conditions, a blowing agent which forms a gas when exposed to hyperthermal conditions, and a coordination complex of platinum the coordination complex of platinum comprising less than 0.1% by weight of the composition.

12. A method for protecting a substrate from fire or thermal extreme comprising applying to the substrate a composition which responds to hyperthermal conditions by expanding to at least twice its original thickness to form a char, the composition comprising sufficient platinum dispersed therein to increase the char life at least 10% as compared with the same composition without the platinum dispersed therein, the platinum comprising less than 0.1% by weight of the composition.

13. The method of claim 12 wherein the composition further comprises an organic polymer binder.

14. The method of claim 12 wherein the organic binder is a thermoplastic in an organic solvent.

15. The method of claim 12 wherein the platinum is in the form of a coordination complex.

16. The method of claim 15 wherein the composition further comprises a nickel coordination complex.

17. The method of claim 16 wherein the nickel and platinum are in the form of a mixed complex, the atomic ratio of platinum to nickel in the mixed complex being between 1:20 and 1:100.

18. The method of claim 17 wherein the mixed complex is cationic and includes a tetrafluoroborate anion.

19. The method of claim 15 wherein the platinum complex is premixed with a liquid resin carrier.

20. The method of claim 12 wherein the platinum is dispersed uniformly throughout the composition.

* * * * *